United States Patent [19]
Abe

[11] Patent Number: 5,953,476
[45] Date of Patent: Sep. 14, 1999

[54] OPTICAL CONNECTOR

[75] Inventor: Kenji Abe, Tokyo, Japan

[73] Assignee: Hirose Electric Co., Ltd., Tokyo, Japan

[21] Appl. No.: 09/013,184

[22] Filed: Jan. 26, 1998

[30]    Foreign Application Priority Data

Jan. 24, 1997  [JP]  Japan .................................. 9-011520

[51] Int. Cl.⁶ .................................................. G02B 6/36
[52] U.S. Cl. ............................... 385/87; 385/69; 385/86
[58] Field of Search ................................ 385/69, 86, 87

[56]              References Cited

U.S. PATENT DOCUMENTS

| 5,091,990 | 2/1992 | Leung et al. | 385/87 |
| 5,101,463 | 3/1992 | Cubukciyan et al. | 385/87 |
| 5,222,169 | 6/1993 | Chang et al. | 385/87 |
| 5,390,272 | 2/1995 | Repta et al. | 385/87 |
| 5,396,572 | 3/1995 | Bradley et al. | 385/87 |
| 5,671,310 | 9/1997 | Lin et al. | 385/87 |

*Primary Examiner*—Rodney Bovernick
*Assistant Examiner*—Robert E. Wise
*Attorney, Agent, or Firm*—Kanesaka & Takeuchi

[57]              ABSTRACT

The stop ring of an optical connector is made by molding. The intermediate section of the stop ring is tapered to the front end to provide a satisfactory strength when the rear section of the stop ring is pressed by crimping. The rear section is provided with a knurl having front or sharp edges to provide resistance to separation of the braid of an optical cable.

3 Claims, 10 Drawing Sheets

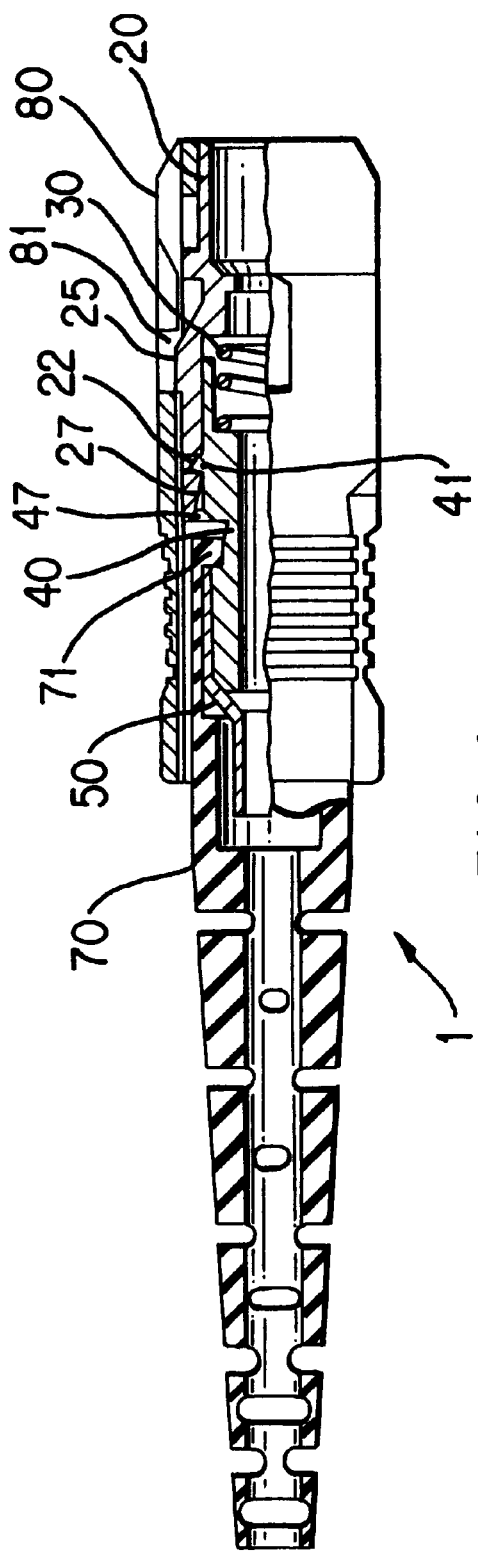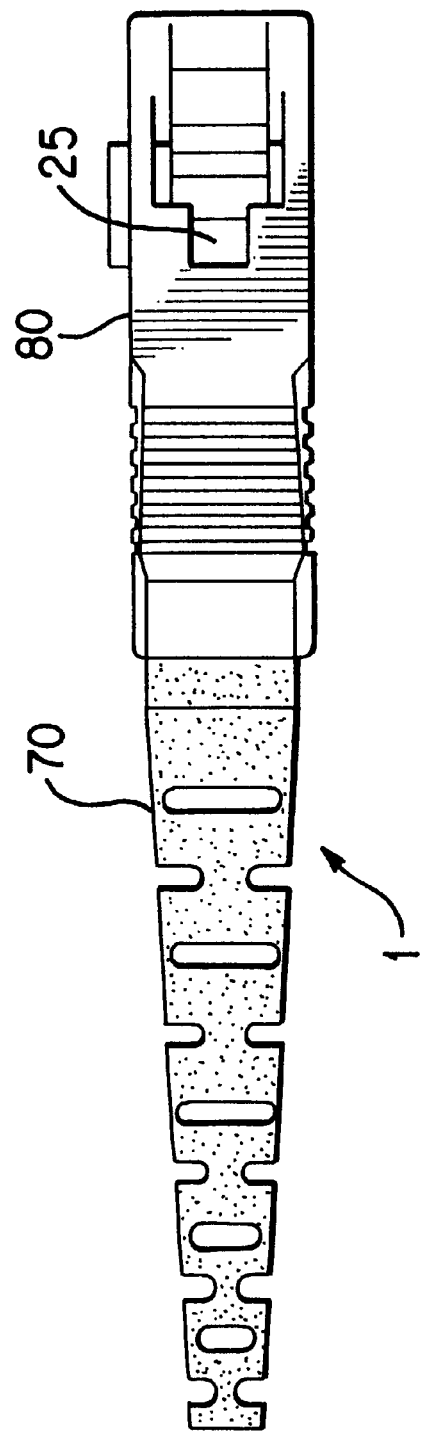
FIG. 1a
FIG. 1b

OPTICAL CONNECTOR

BACKGROUND OF THE INVENTION

1. Field of the Invention

The present invention relates to optical connectors and, especially, to an optical connector having an improved stop ring.

2. Description of the Related Art

A conventional optical connector will be described below. As FIG. 7(a) shows, an optical fiber cable 10 comprises a fiber element 11, a core wire 13, a braid 15, and a sheath 17. When the optical fiber cable 10 is attached to a connector, a variety of components are attached to the optical fiber cable 10. Different lengths of the sheath 17, braid 15, and core wire 13 are removed in order to expose the fiber element 11, core wire 13, and braid 15. Then, as FIG. 7(b) shows, a ferrule 19 is attached to a front end of the optical fiber cable 10 before components of the connector are attached. FIG. 8 shows the optical fiber cable 10 attached to the connector 1.

In FIG. 8, the optical fiber cable 10 is attached to the ferrule 19 via the fiber element 11 and the core wire 13. The fiber element 11 goes through the ferrule 19 and attached to the front end of the ferrule. The core wire 13 is inserted into and attached to the rear opening of the ferrule 19.

The connector 1 comprises a plug frame 20, a coil spring 30, a stop ring 40, a deformable ring 50, a pressure ring 60, an insulative hood 70, and a knob 80. These components are assembled in sequence at the front end of the optical fiber cable 10. The ferrule 19 attached to the optical fiber cable 10 is inserted into the plug frame 20 from back through an opening of an inner flange 21 until an outer flange 18 of the ferrule 19 abuts against the inner flange 21.

The coil spring 30 is placed between the outer flange 18 of the ferrule 19 and the stop ring 40 which is made from a metal to bias the ferrule 19 forwardly so that upon plugging, the ferrule 19 is movable in the axial direction.

The stop ring 40 is placed behind the plug frame 20 so as to cover the coil spring 30. The front section of the stop ring 40 is inserted into the rear opening of the plug frame 20. FIG. 9 shows the stop ring 40 and the plug frame 20. In order to connect the plug frame 20 and the stop ring 40, a pair of arcuate projections 41 are provided on the stop ring 40 while a pair of slots 22 are provided in the plug frame 20. When the front end of the stop ring 40 is inserted into the rear opening of the plug frame 20, the rear section of the plug frame 20 snaps the stop ring 40, with the arcuate projections 41 of the stop ring 40 are fitted into the slots 22 of the plug frame 20.

The deformable ring 50 made from aluminum is placed on the rear section of the stop ring 40, and the front section of the deformable ring 50 is cramped on the rear section of the stop ring 40. The braid 15 (FIG. 7(a) and (b)) is fixed between the deformable ring 50 and the stop ring 40. The rear section of the deformable ring 50 is reduced to provide a reduced section 51 over which the pressure ring 60 made from stainless or brass is placed and cramped. The sheath 17 (FIG. (a) and (b)) is fixed between the pressure ring 60 and the reduced section 51 of the stop ring 50.

The insulative hood 70 covers the deformable ring 50 and the pressure ring 60. A protruded edge 71 is provided on the front end of the insulative hood 70 so that when the insulative hood 70 is inserted over the deformable ring 50, the protruded edge 71 engages the front edge of the deformable ring 50 to prevent the insulative hood 70 from coming out of the deformable ring 50. The protruded edge 71 also is fitted in a circular groove in a middle section 44 of the stop ring 40 and engages a shoulder of a rear section 46 of the stop ring 40 to prevent the insulative hood 70 from coming out of the stop ring 40.

How to attach these connector components to the optical fiber cable 10 will be described with reference to FIGS. 7 and 8. As FIG. 7(c) shows, the insulative hood 70, the pressure ring 60, the deformable ring 50, the stop ring 40, and the coil spring 30 are attached in this order to the optical fiber cable 10. As FIG. 7(a) shows, the sheath 17 of the optical fiber cable 10 is removed to expose the fiber element 11, the core wire 13, and the braid 15. As FIG. 7(b) shows, the ferrule 19 is attached to the optical fiber cable 10 via the core wire 13 and fiber element 11.

As FIG. 8 shows, the ferrule 19 is inserted into the opening of the inside flange 21 of the plug frame 20. The coil spring 30 is placed into the rear opening of the plug frame 20 such that the front end of the coil spring 30 is held by the plug fame 20 via the ferrule 19 while the rear end of the coil spring 30 is held by the stop ring 40. The front end of the stop ring 40 is inserted into the rear opening of the plug frame 20 such that the arcuate projections 41 are fitted into the slots 22 of the plug frame 20. The braid 15 are arranged on the rear section of the stop ring 40 and the deformable ring 50 is placed on the stop ring 40 to hold the braid 15 and the deformable ring 50 is crimped. Then, the front end of the sheath 17 is placed on the reduced section 51 of the deformable ring 50 and the pressure ring 60 is moved to the right in FIG. 7 and crimped on the reduced section 51 of the deformable ring 50. Finally, the insulative hood 70 is moved to the right in FIG. 7 to cover the deformable ring 50 and rear section of the stop ring 40.

As FIG. 7(d) shows, the knob 80 is attached to the plug frame 20 by moving the knob 80 and the optical fiber cable in directions shown by arrows. As FIG. 8 shows, openings 81 are provided in the respective faces of the knob 80, and projections 25 are provided on the plug frame 20 (FIG. 9) to engage the openings 81 to fix the knob 80.

FIG. 10 shows a optical connector which the inventor has developed before. FIGS. 10(a) and (b) are an axial section and a top plan view of the connector. In FIG. 10(a), the axial section is shown above the central line while the side view of the connector 1 is shown below the central line. The optical fiber cable and ferrule are omitted from these figures. The components, structures, functions, and assembling of the connector are substantially the same as those of the conventional one except for those hereinafter described. Like components are given like reference numerals throughout the figures.

FIG. 11 shows a stop ring 40 of the connector of FIG. 10. FIGS. 11(a) and (b) are half-sections side and top views of the stop ring 40, respectively. The stop ring 40 is made from a metal by cutting.

Unlike the conventional one, the front section 42 of the stop ring 40 is provided with upper and lower arcuate projections 41 and a circular projection 47. As FIG. 10(a) shows, when the stop ring 40 is attached to the plug frame 20, the circular projection 47 is attached to the plug frame 20. An inside inclined face 27 is provided on the plug frame 20 from the slot 22 to the end of the plug frame 20 corresponding to the circular projection 47 so as to receive the circular projection 47 when the stop ring 40 is attached to the plug frame 20.

The rear section 46 of the stop ring 40 is provided with a knurl 49. As FIG. 12 shows, the rear portion 46 of a conventional stop ring 40 has a flat part because a complicated form cannot be made by cutting or, if possible, the cost is prohibitively high. Consequently, the rear section 46 has poor grip to the braid 15 (FIGS. 10(*b*) and (*c*)), and the braid is fixed by only the pressure of the deformable ring onto the knurl 49.

In FIG. 11, the intermediate section 44 between the rear section 46 and the front section 42 of the stop ring is provided with a reduced diameter having an even thickness to receive the inside projection 71 of the insulative hood (FIG. 10(*a*)). In this example, the inside projection 71 extends the entire circumference of the insulative hood.

Where the stop ring is made from a metal, it is necessary to use cutting for forming it, resulting in the high manufacturing cost. In addition, as the optical fiber cable becomes thin, the weight of a connector puts more burden on the optical fiber cable, causing the breakage of the optical fiber cable when it is attached to the connector.

Where the stop ring is made by molding, it is weaker than the metal one, causing breakage. In addition, it is necessary to reduce the crimping power to the stop ring, failing to prevent the braid from coming out of the stop ring and deformable ring. Where the rear portion of the stop ring is flat, the separation of the braid takes place more frequently.

SUMMARY OF THE INVENTION

Accordingly, it is an object of the invention to provide a stop ring which is made by molding to reduce the manufacturing cost and the weight, and has an improved form to provide a strength as high as the strength of metal stop rings, and is able to prevent separation of the braid from the connector.

According to the invention there is provided an optical connector for an optical fiber cable comprising a core wire and a braid, comprising a ferrule to be connected to the core wire; a connector frame for holding the ferrule and having a rear section; a molded stop ring having a rear section and a front section which is fixed to the rear section of the connector frame such that the optical fiber cable is drawn rearwardly; and a deformable ring to be pressed on the rear section of the stop ring to secure the braid on the rear section of the stop ring.

It is preferred that the stop ring is provided with an intermediate section between the front and rear sections, the intermediate section being tapered to the front section.

According to another aspect of the invention it is preferred that the rear section of the stop ring is provided with a knurl.

It is further preferred that the knurl has such a form as to provide resistance to rearward pulling of the braid when the deformable ring is pressed on the rear section of the stop ring.

BRIEF DESCRIPTION OF THE DRAWINGS

FIGS. 1(*a*) and (*b*) are partially sectional side and top views of a connector according to an embodiment of the invention;

DESCRIPTION OF THE PREFERRED EMBODIMENT

Figure 10A:
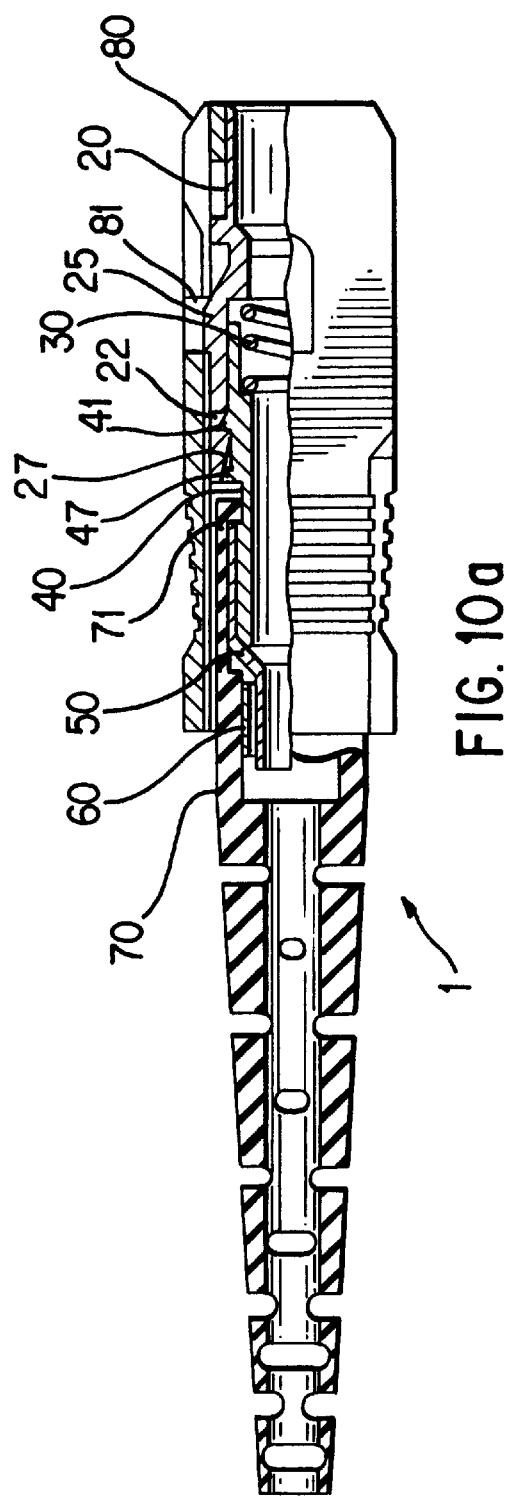
FIGS. 10(*a*) and (*b*) are side and top views of another optical connector.
Figure 10B:
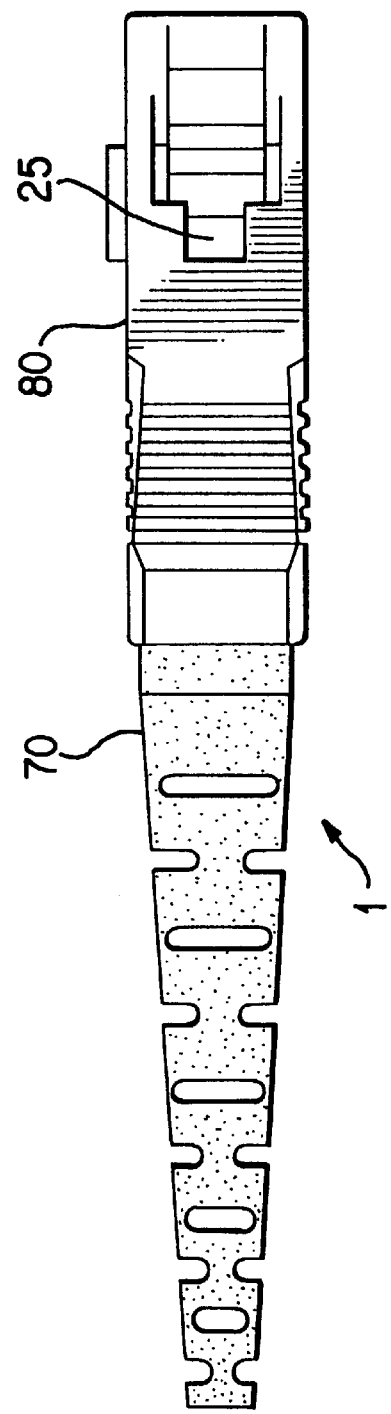

FIGS. 1(*a*) and (*b*) show a connector according to an embodiment of the invention which corresponds to FIGS. 10(*a*) and (*b*). FIGS. 1(*a*) and (*b*) are a half-sectional side view and a top plan view of the connector, respectively. In FIG. 1(*a*), the axial section is shown above the central line while the side face is shown below the central line. The optical fiber cable and ferrule are omitted from these figures.

Figure 8:
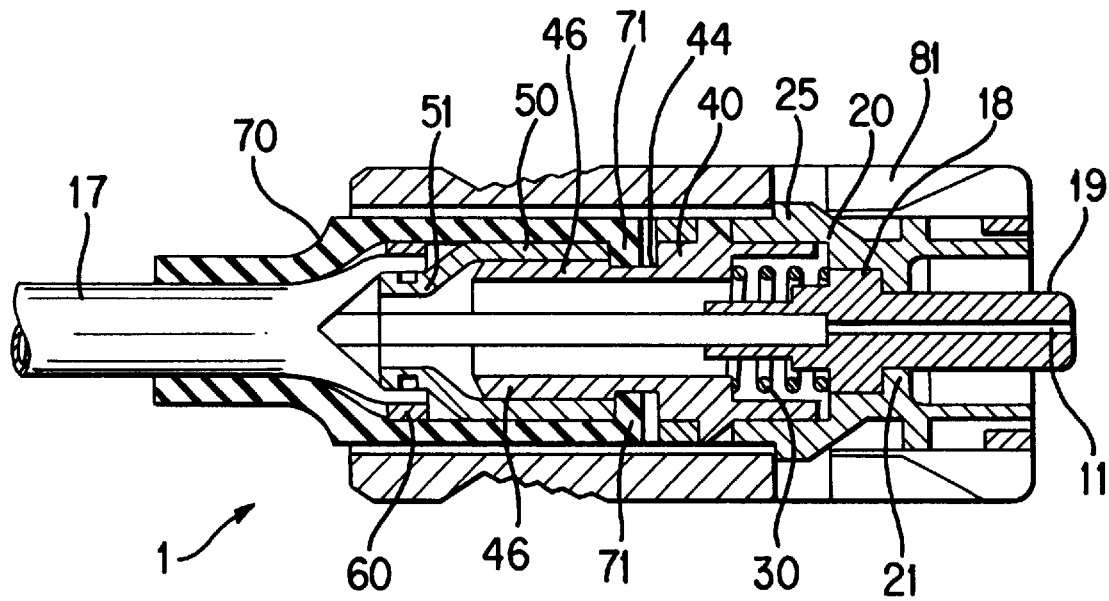
FIG. 8 is a longitudinal section of an optical connector.
Figure 9:
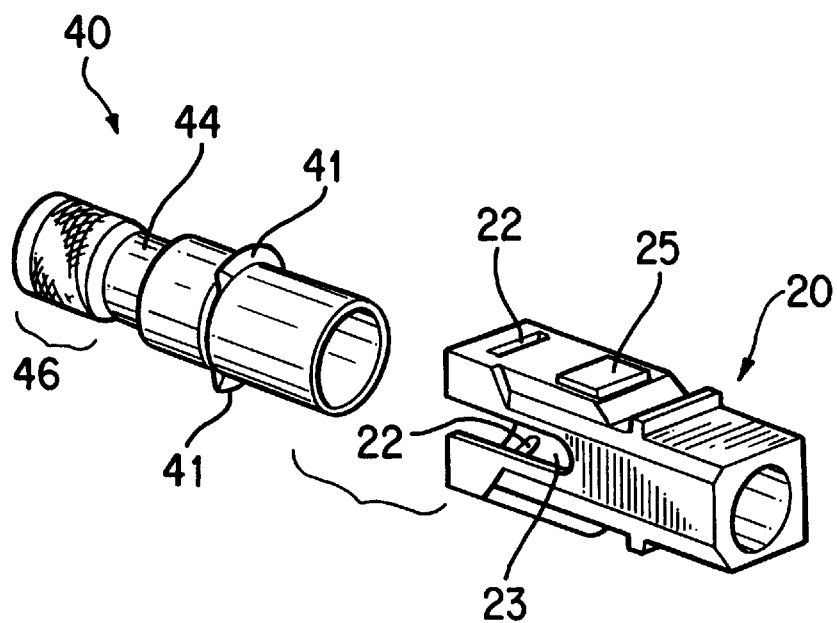
FIG. 9 is a perspective view of a stop ring and a plug frame.

The structure and components of the connector are identical with the connector of FIG. 10 except that the pressure ring 60 (FIGS. 8 and 10) is eliminated. The connector 1 comprises the plug frame 20, the coil spring 30, the stop ring 40, the deformable ring 50, the insulative hood 70, and the knob 80. The functions of the respective components are the same as those of the examples described above except for the stop ring 40. The process of attachment is substantially the same as that of the example FIG. 10. However, since there is no pressure ring (FIGS. 8 and 13), it is unnecessary to crimp the pressure ring to hold the sheath of an optical fiber cable. The other features are the same as the examples set forth above including that the braid 15 of an optical fiber cable 10 is placed between the stop ring 40 and the deformable ring 50 and fixed with the deformable ring 50 and that the reduced section of the deformable ring 50 is covered by the front end of the sheath 17 of an optical fiber cable 10.

Figure 2B:
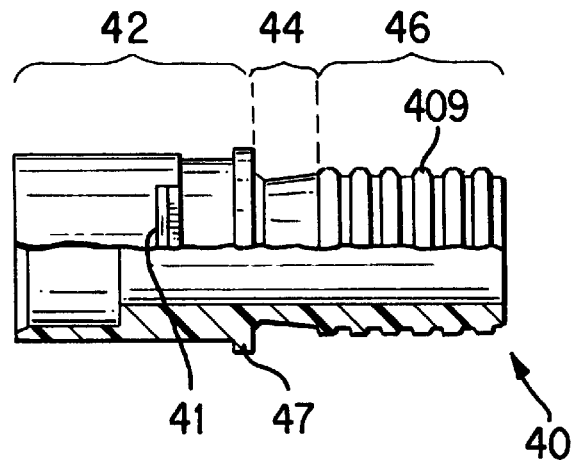
FIGS. 2(*a*), (*b*), and (*c*) are enlarged side, top, and front views of a stop ring for the connector.
Figure 2A:
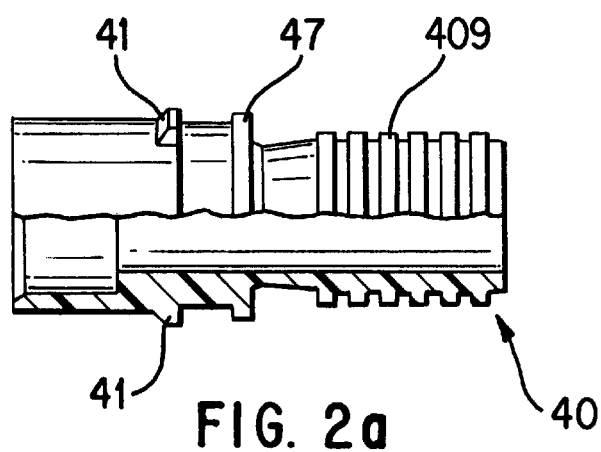
Figure 2C:
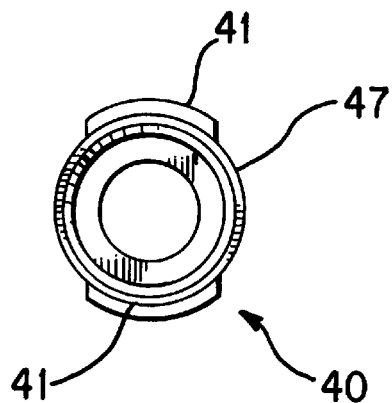
Figure 11A:
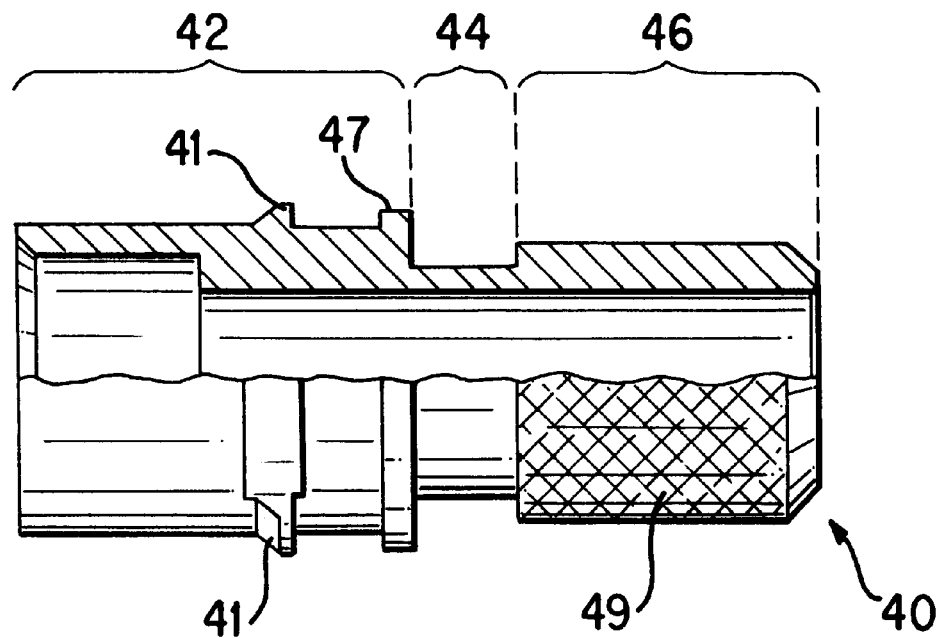
FIGS. 11(*a*) and (*b*) are side and top view of a stop ring for the connector of FIG. 10.
Figure 11B:
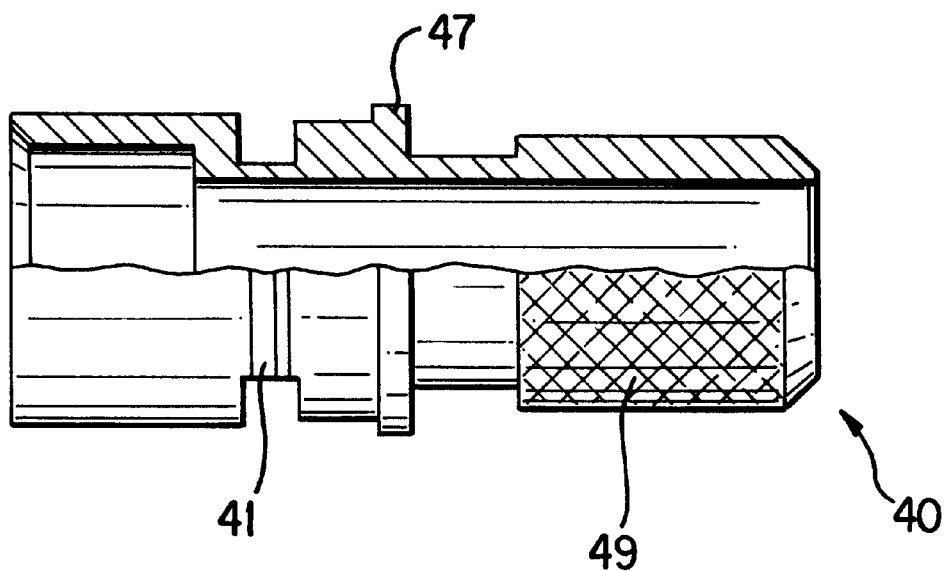
Figure 12:
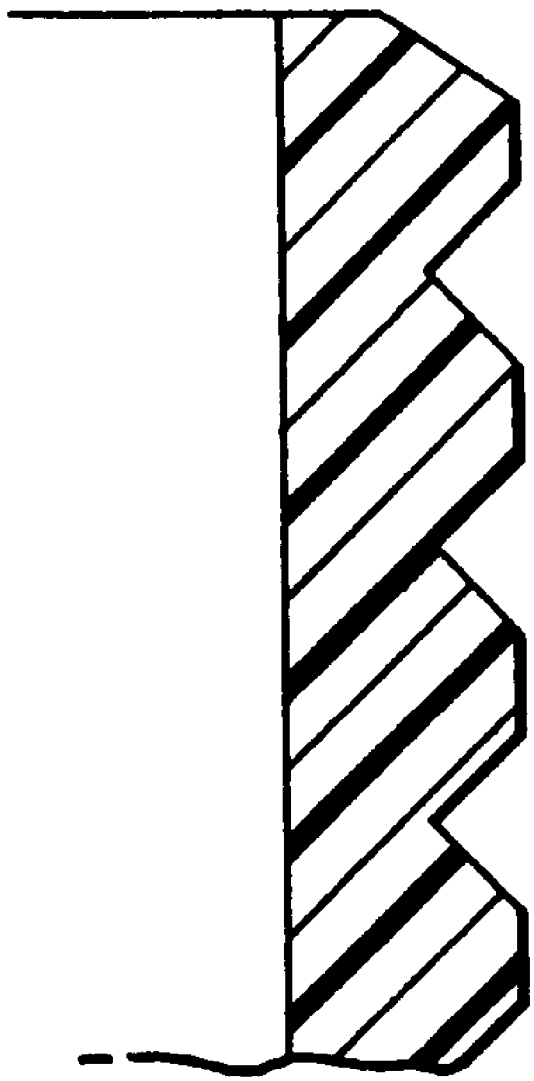
FIG. 12 is an enlarged view of the rear section of the stop ring of FIG. 11.

FIG. 2, which corresponds to FIG. 11, shows the stop ring 40 of the connector of FIG. 1. FIGS. 2(*a*) and (*b*) are half-sectional side and top views of the stop ring, respectively. FIG. 2(*c*) is a front view of the stop ring in FIGS. 2(*a*) and (*b*). It is noted that the stop ring is made from a plastic by molding, thereby eliminating the cutting process required for the metal rings, resulting in the reduced manufacturing cost and making the volume production possible. The weight is so smaller than that of the metal ones that it hardly breaks the thin optical fiber cable. The stop ring is improved in the intermediate and rear sections so as to not only provide a strength as high as that of the metal ones but also firmly grip the braid between the stop ring and the deformable ring.

In FIGS. 2(*a*) and (*b*), the front section 42 of the stop ring 40 is provided with arcuate projections 41 and a circular projection 47. The functions are the same as those set forth above. That is, the arcuate projections 41 are fitted in the slots 22 of the plug frame (FIG. 1) to fix the stop ring 40 to the plug frame 20. The circular projection 47 is received by the inside inclined face 27 (FIG. 1) of the plug frame 20 to fix the stop ring to the plug frame. The arcuate projections 41 are provided at upper and lower positions as a pair on the stop ring 40. The circular projection 47 is provided on the front section 42 of the stop ring behind the arcuate projections 41.

Figure 3A:
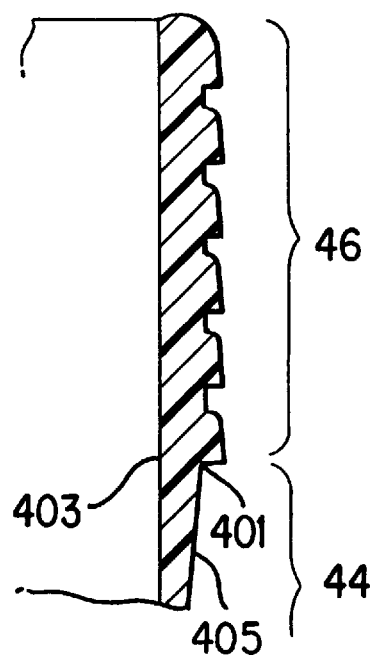
FIGS. 3(*a*) and (*b*) are enlarged sectional views of the intermediate section of the stop ring.
Figure 3B:
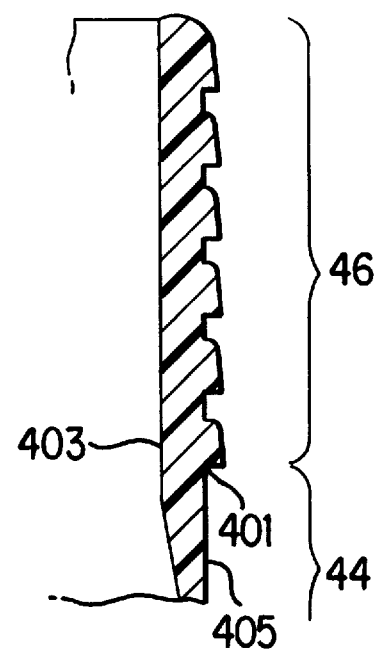
Figure 4A:
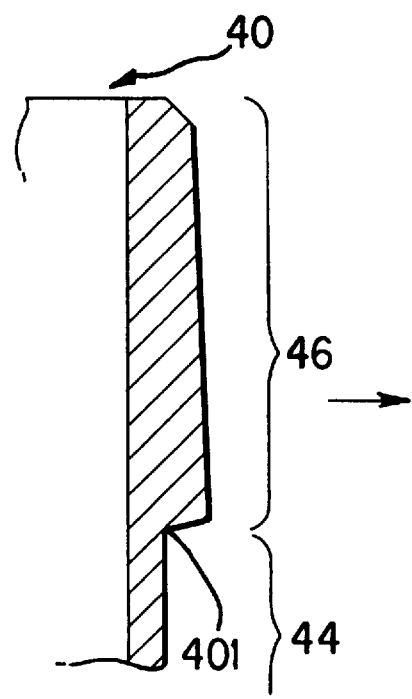
FIGS. 4(*a*) and (*b*) are enlarged sectional views of the intermediate section of a conventional stop ring.
Figure 4B:
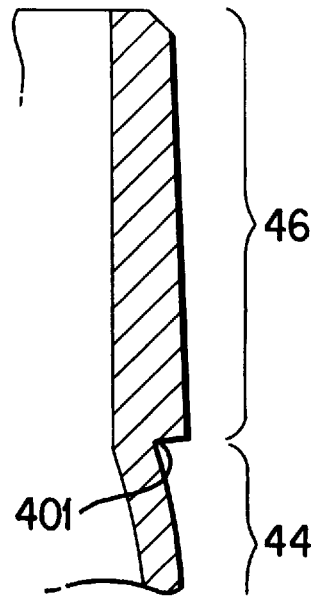

In FIGS. 2(a) and (b), the intermediate section 44 between the front section 42 and the rear section 46 of the stop ring 40 is tapered forwardly to provide an increasingly reduced outside diameter. FIG. 3 shows the intermediate section 44 in enlarged size. FIG. 4 shows the corresponding section of a conventional ring. FIGS. 3(a) and 4(a) shows the stop rings before the deformable ring is crimped while FIGS. 3(b) and 4(b) shows them after the deformable ring is crimped.

In FIG. 4(a), the intermediate section 44 of a conventional stop ring has an even wall thickness so that when the rear section 46 is pressed by crimping the deformable ring, the stress concentrates at a joint 401 between the intermediate and rear sections 44 and 46, as shown in FIG. 4(b), reducing the strength of the stop ring. By contrast, the intermediate section 44 according to the invention has an outside surface 405 tapered toward the axis of the ring to provide the joint 401 with the largest thickness in the intermediate section so that when the rear section 46 is pressed by the deformable ring 46, the stress is prevented to concentrate at the joint 401 but is distributed to the whole intermediate section 46. As FIG. 3(b) shows, when the rear section 46 is pressed by crimping, the outside surface 405 of the intermediate section 44 is made parallel to the axis of the stop ring while the inside surface 403 diverges from the axis of the stop ring.

Figure 5A:
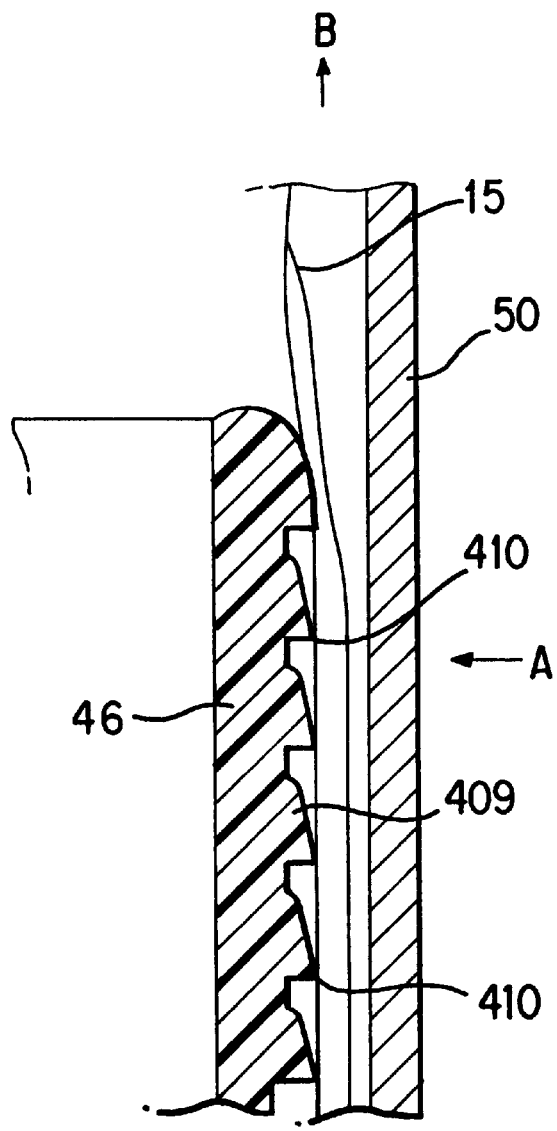
FIGS. 5(*a*) and (*b*) are enlarged sectional views of the rear section of the stop ring according to the invention.
Figure 5B:
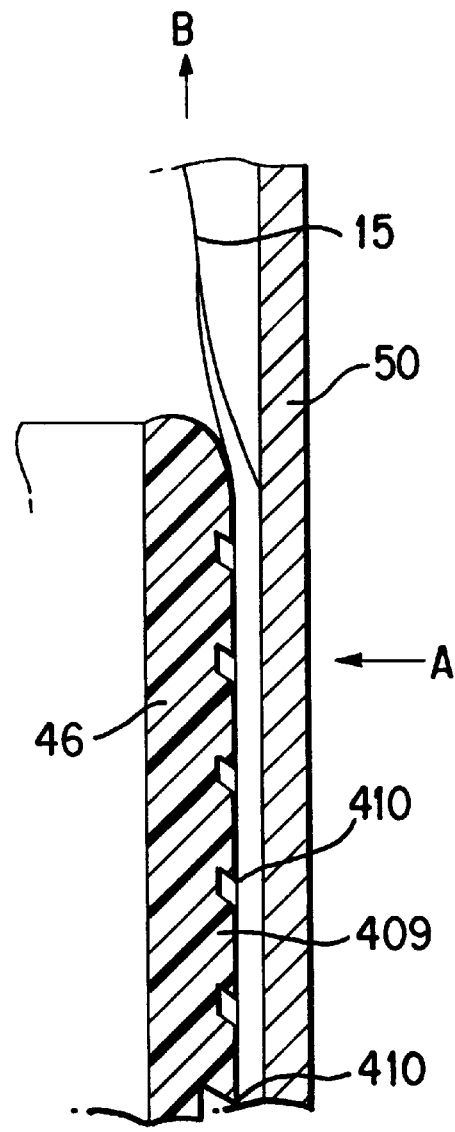

In FIGS. 2(a) and (b), a plurality of knurls 409 are provided on the rear section 46 of the stop ring 40. Each knurl 409 has a substantially rectangular sectional shape but, as FIGS. 5(a) and (b) show, it has a sharp front edge 410. FIG. 5(a) shows the rear section 46 together with the braid 15 and the deformable ring 50 before the deformable ring is crimped whereas FIG. 5(b) shows the rear section 46 after the deformable ring 50 is crimped in a direction A. Before the rear section 46 is pressed by the crimped ring 50, the front edges 410 of the knurls 409 are projected outwardly but, after the deformable ring 50 is crimped, they are collapsed forwardly. Consequently, the edges 410 are directed more forwardly to secure the braid 15 of the optical fiber cable 10 between the stop ring 40 and the deformable ring 50. Consequently, if the braid 15 is pulled rearwardly or a direction B, the forward projecting edges 410 prevent the braid 15 from being pulled out. Since the stop ring 40 is made by molding, it is not only easy to make such a complicated form as this but also possible to direct the front edges forwardly with a small force in comparison with the metal stop ring. Since the molding has a strength lower than that of the metal one, it is necessary to lower the crimping force.

By directing the front edges forwardly, it is possible to provide the molding with a gripping power equal to that of the metal. If the knurls are spaced, the same results as above are produced as long such front edges as above are provided. If the knurls are the crossed as in FIG. 11, the same results are produced by providing the similar front edges.

Figure 6:
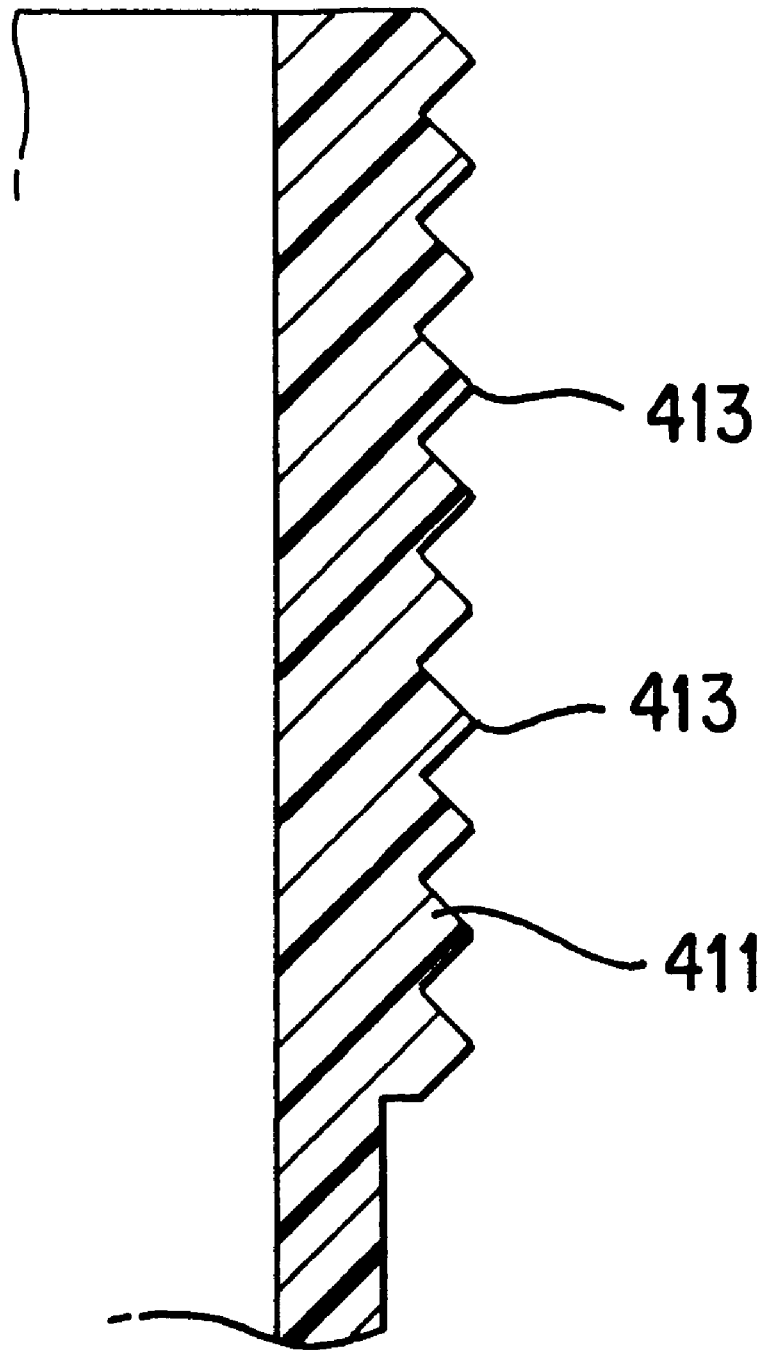
FIG. 6 is a sectional view of a knurl according to an embodiment of the invention.
Figure 7A:
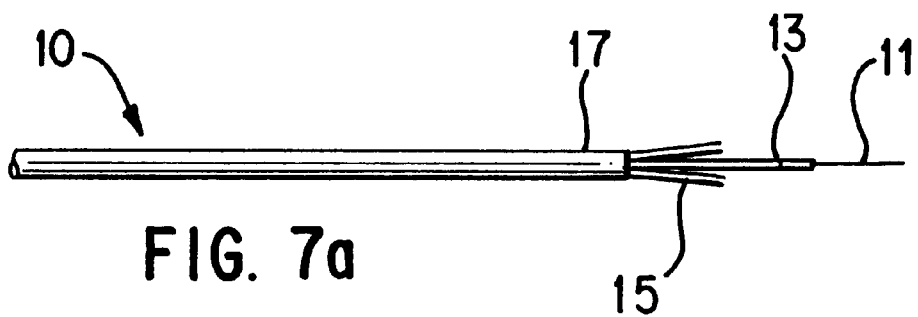
FIGS. 7(*a*)–(d) are side views of a conventional optical fiber connector, showing the assembling process.
Figure 7B:
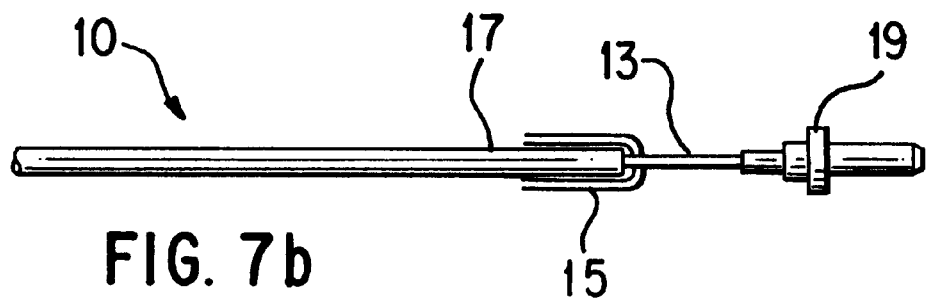
Figure 7C:
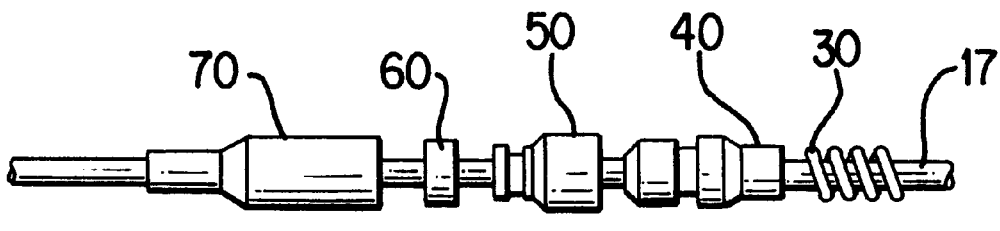
Figure 7D:
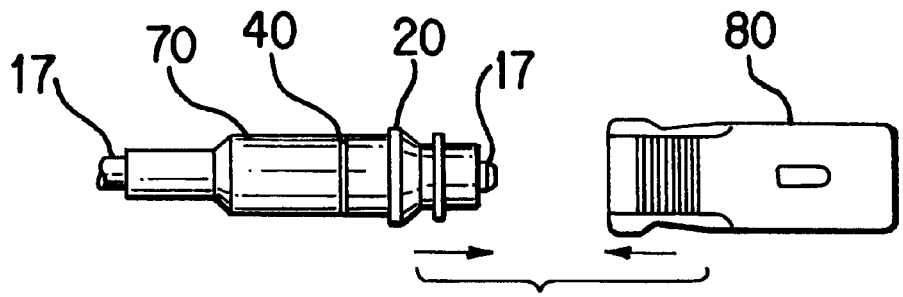

FIG. 6 shows a knurled section according to another embodiment of the invention, including both parallel and cross knurls before the deformable ring is crimped corresponding to FIGS. 4(a) and 5(a). Each knurl 411 has a sharp edge 413 and a triangle sectional shape unlike that of FIG. 5. The sharp edges 413 project outwardly in a direction perpendicular the axis of the stop ring. When the deformable ring is crimped, the sharp edges 413 cut into the braid to produce the same results as those of the front edges 410. If the sharp edges 413 are made to project forwardly as the front edges 410 of FIG. 5, the same functions as those of the front edges 410 are obtained with respect to the braid.

The form of the knurl 409 in FIG. 5 can be made by only molding. Although the knurl 411 of FIG. 6 can be made by cutting, the cutting process is expensive.

By attaching an adhesive microcapsule (not shown) to the rear section of the stop ring 40 it is possible to strengthen the joint of the stop ring 40 and the deformable ring 50.

Making the stop ring by molding makes possible mass production of the stop ring, and the stop ring lighter and the manufacturing cost lower. The molded stop ring according to the invention is 30% lighter than the conventional metal stop ring. The mass production and manufacturing cost are improved by increasing the number of metal molds.

By molding the stop ring it is possible to make the desired shape of the rear section for fixing the braid, thereby providing a gripping power as high as that of the metal stop ring.

What is claimed is:

1. An optical connector for an optical fiber cable comprising a core wire and a braid, comprising:

a ferrule to be connected to said core wire;

a connector frame for holding said ferrule and having a rear section;

a molded stop ring having a rear section and a front section which is fixed to said rear section of said connector frame such that said optical fiber cable is drawn rearwardly; and a deformable ring to be pressed on said rear section of said stop ring to secure said braid on said rear section of said stop ring, wherein said stop ring is provided with an intermediate section between said front and rear sections, said intermediate section being tapered to said front section.

2. An optical connector according to claim 1, wherein said rear section of said stop ring is provided with a knurl.

3. An optical connector according claim 2, wherein said knurl has such a form as to provide resistance to rearward pulling of said braid when said deformable ring is pressed on said rear section of said stop ring.

* * * * *